United States Patent [19]

Kuhfuss, Jr. et al.

[11] 4,276,952
[45] Jul. 7, 1981

[54] APPARATUS FOR INSTALLING VEHICLE COMPONENTS

[75] Inventors: Alvin L. Kuhfuss, Jr., Morton; Craig W. Riediger, Washington, both of Ill.

[73] Assignee: Caterpillar Tractor Co., Peoria, Ill.

[21] Appl. No.: 81,220

[22] PCT Filed: Mar. 16, 1979

[86] PCT No.: PCT/US79/00158

§ 371 Date: Mar. 16, 1979

§ 102(e) Date: Mar. 16, 1979

[87] PCT Pub. No.: WO80/01894

PCT Pub. Date: Sept. 18, 1980

[51] Int. Cl.[3] .................................................. B60K 5/10
[52] U.S. Cl. .................................... 180/294; 180/70 R
[58] Field of Search ............. 180/291, 294, 295, 296, 180/298, 299, 68.5, 70 R; 403/13, 14; 414/522, 559, 746; 224/42.43, 42.44; 308/3 R; 312/321, 339, 350; 280/755, 759; 74/16, 606; 248/544, 554, 657

[56] References Cited

U.S. PATENT DOCUMENTS

| 946,151 | 1/1910 | Patterson | 312/339 |
|---|---|---|---|
| 1,893,609 | 1/1933 | Austin | 180/294 |
| 2,095,058 | 10/1937 | Cross | 180/294 |
| 3,693,273 | 9/1972 | Sullivan | 37/129 |
| 3,783,964 | 1/1974 | Telesio | 180/294 |
| 3,871,462 | 3/1975 | Unruh | 180/70 R |
| 3,872,612 | 3/1975 | Durgan | 294/67 AA |
| 3,966,061 | 6/1976 | Fehn et al. | 180/294 X |
| 3,998,488 | 12/1976 | Gee | 37/8 |
| 4,019,600 | 4/1977 | Master et al. | 180/70 R |
| 4,126,201 | 11/1978 | Stevens | 180/70 R |

Primary Examiner—John J. Love
Assistant Examiner—Randall A. Schrecengost
Attorney, Agent, or Firm—Phillips, Moore, Weissenberger, Lempio & Majestic

[57] ABSTRACT

A vehicle component (10) is removably mounted on a stationary support (11) thereof. A pair of rollers (17,17a) rotatably mounted on the component (10) each engages a rail (18,18a) secured on the support (11) to thus precisely guide movements of the component (10) upon installation or removal thereof. The apparatus of this invention provide for the expeditious and precise handling of the component (10), compensate for avoidance of interference with structural parts of the vehicle during such handling, and are adapted for use with components, such as modular transmission packages having varied designs.

10 Claims, 9 Drawing Figures

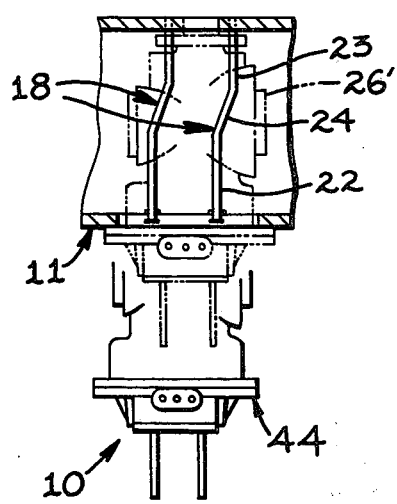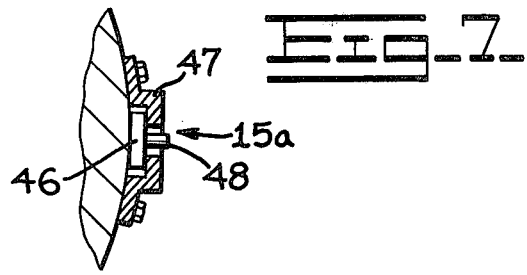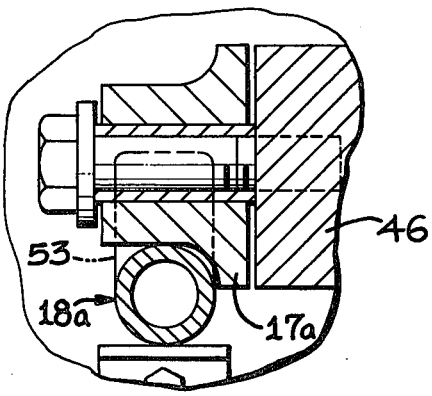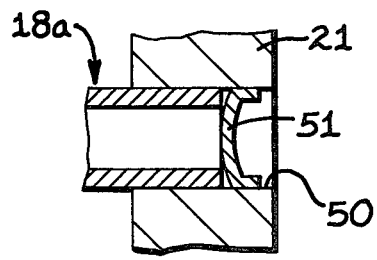

APPARATUS FOR INSTALLING VEHICLE COMPONENTS

DESCRIPTION

Technical Field

This invention relates to mounting apparatus for removably mounting a component on a vehicle and more particularly relates to the installation of a modular transmission package within a housing secured on a frame of the vehicle.

Background Art

Modern-day construction vehicles are normally built on a modular concept whereby component parts thereof may be readily installed and removed for servicing purposes. For example, when a construction vehicle, such as a track-type tractor, is working at a remote job site, the transmission thereof any require in-the-field replacement or repair. Although the transmission package may be readily detached from within a support housing secured on a frame of the vehicle, as well as from an associated engine-driven drive shaft and drive axles, it has proven difficult to remove the transmission package from the vehicle due to interference with adjacent portions thereof.

In particular, the overall weight of the transmission package and the interference with adjacent structural components of the vehicle, such an overhanging portions of the vehicle's cab and fuel tank, render the installation and removal procedures difficult by use of conventional apparatus and methods. A standard practice in the industry is to secure one or more eye bolts to the transmission package for attachment of a pulley and cable system thereto. This practice works well for transmission packages employed on the smaller type vehicles and, in particular, when a portion of the transmission package projects substantially beyond a support housing therefor.

However, the larger transmission packages not only exhibit substantially increased weight but are virtually inaccessible for the attachment of a pulley and cable system thereto. Furthermore, many such transmission packages must be tilted and/or moved laterally upon installation and removal thereof to adapt them for precise positioning in their support housings and for proper alignment with attendant drive mechanisms, such as the drive shaft and axles of the vehicle.

Disclosure of the Invention

The present invention is directed to overcoming one or more of the problems as set forth above.

In one aspect of this invention, a vehicle comprises a support having a component of the vehicle removably mounted thereon. A first guide means is secured on the component to engage and be supported by a second guide means secured on the support whereby the component may be precisely guided for movement between its removed and installed positions relative to the support. Once the component is moved to its installed position, it is releasably secured to the support by fastening means. The improvement resides in the first guide means which includes a bar and means for slidably mounting the bar on the component for reciprocal movement thereon between extended and retracted positions.

This invention thus provides apparatus for expeditiously and precisely installing and removing a vehicle component from a support thereof at a remote job site. The vehicle component, such as a transmission package, may be adapted for installation on and removal from vehicles wherein structural parts of the vehicle would normally interfere therewith. Furthermore, this invention is adapted for use with transmission packages and support housings therefor, having varied configurations requiring a tipping and/or lateral displacement of a particular transmission package upon installation and removal thereof from the housing.

BRIEF DESCRIPTION OF THE DRAWINGS

Other objects of this invention will become apparent from the following description and accompanying drawings wherein:

FIG. 4 is a reduced partial top plan view, taken in the direction of arrows IV—IV in FIG. 2 and with parts broken-away, illustrating guide rollers and rollers of the mounting apparatus;

FIG. 7 is a sectional view, taken in the direction of arrows VII—VII in FIG. 6;

FIG. 8 is an enlarged sectional view, taken in the direction of arrows VIII—VIII in FIG. 6; and FIG. 9 is an enlarged view, taken within circle IX in FIG. 7.

BEST MODE OF CARRYING OUT THE INVENTION

Figure 1:
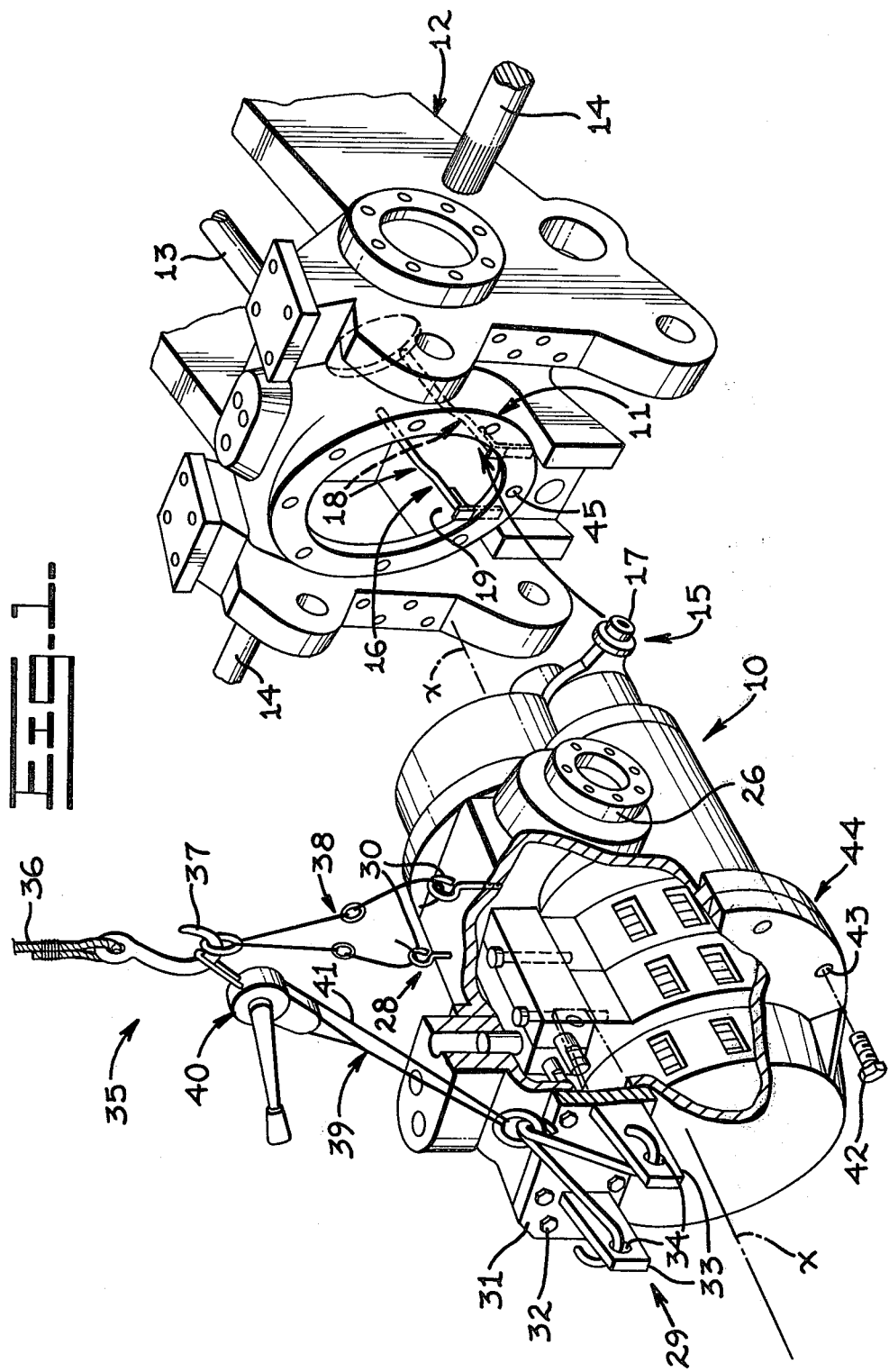
FIG. 1 is an isometric view showing a transmission package removed from a support housing of a vehicle and employing a mounting apparatus embodiment of the present invention therewith.
Figure 2:
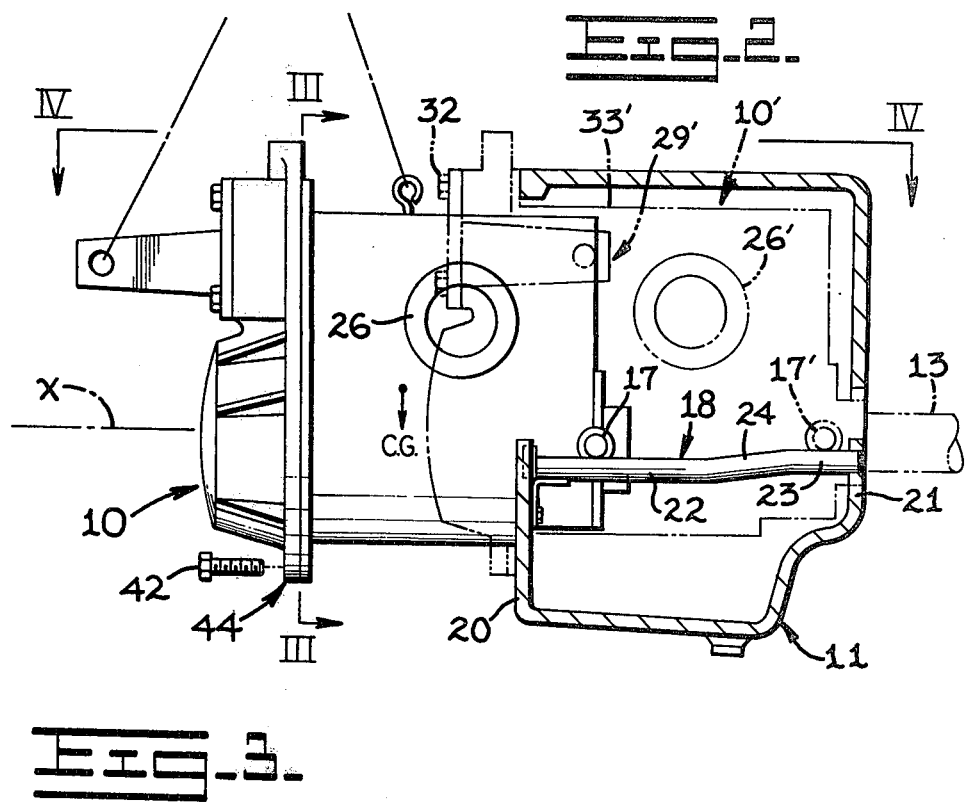
FIG. 2 is a partially sectioned, side-elevational view illustrating partial insertion of the transmission package into the housing.

FIG. 1 illustrates a vehicle component 10, such as a transmission package, adapted for installation on a support housing 11 secured on a frame 12 of a construction vehicle, such as a track-type tractor. As shown in FIGS. 1 and 2, upon installation of transmission package 10 on and within housing 11, an engine-driven drive shaft 13 may be suitably connected in a conventional manner to transmission package 10, along with a pair of drive axles 14. The additional standard drive mechanisms, such as the transfer and bevel gear package, which are associated with drive shaft 13 and drive axles 14, are not directly pertinent to the invention herein and thus are not shown in the drawings for clarification purposes.

The modular design of the above, briefly described power train components, including transmission package 10, facilitates expeditious assembly and servicing thereof. The ability to replace or repair transmission package 10 at a remote job site substantially reduces the down-time of the vehicle to thereby increase its availability and economic worth. To this end, a mounting apparatus embodying this invention includes first guide means 15 secured on transmission package to engage and be supported by second guide means 16 secured within housing 11. Guide means 15 and 16 cooperate to facilitate precise movement of transmission package 10 between its removed position illustrated in FIG. 1 and its installed position 10', illustrated by phantom lines in FIG. 2.

Figure 3:
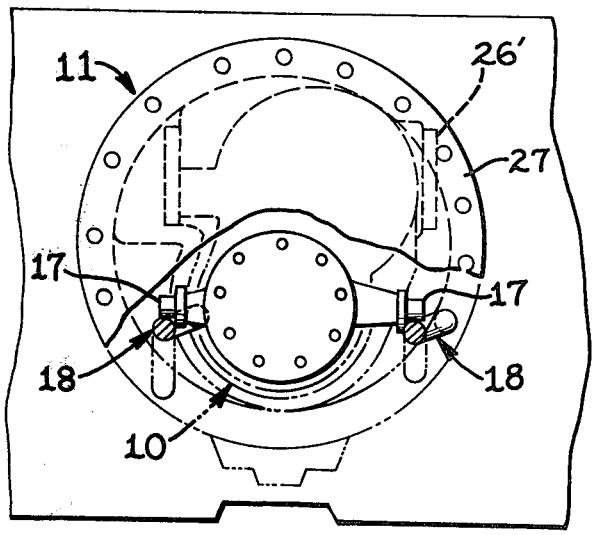
FIG. 3 is a cross-sectional view through the transmission, taken in the direction of arrows III—III in FIG. 2.

As shown in FIGS. 2 and 3, first guide means 15 preferably comprises a pair of laterally-spaced rollers 17 rotatably mounted on a fixed pivot axis on either side and on a forward end of transmission package 10. Second guide means 16 preferably comprises a pair of laterally-spaced rails or rods 18 secured within housing 11 and disposed vertically above on a bottom wall 19 thereof and in at least approximate parallel relationship relative to a longitudinal axis X of the transmission package and housing. Each roller 17 is adapted to engage and be supported by a respective rail 18 whereby transmission package 10 may be moved in rolling, sliding contact relative to housing 11 upon installation or removal thereof.

As shown in FIG. 2, each rail is secured between longitudinally spaced end walls 20 and 21 of housing 11 and in the particular application shown, the rail terminates at such end walls. Furthermore, certain transmission package designs require that each rail 18 include a horizontally disposed rail portion 22, adjacent to a rearward end of housing 11, and a vertically raised rail portion 23, adjacent to a forward end of the housing. The gradual bend or ramp thus formed at intermediate rail portion 24 facilitates insertion of transmission package 10 within housing 11 when an overhanging structure of the vehicle would prevent direct insertion of transmission package 10 within housing 11 and along its longitudinal axis X, i.e., rightward movement of transmission package 10 in FIG. 2 will initially engage roller 17 with rail portion 22 whereafter the roller will move upwardly on rail portion 24 and onto raised rail portion 23. Alternatively, rail portion 24 could be disposed vertically below rail portion 22 in those transmission applications wherein the structural interference occurs below the transmission.

Furthermore, in certain applications of this invention, the transmission package design may dictate the need for a slight lateral movement of the transmission package once it is at least partially moved into the confines of housing 11. Referring to FIGS. 3 and 4, it can be seen that rail portion 23 is displaced laterally outwardly, relative to rail portion 22, whereby roller 17 will not only move upwardly on rail 18 but will also move rightwardly, as viewed in FIG. 3, to properly position transmission package 10 within housing 11. For example, a boss 26, secured on a lateral side of transmission package 10, will prevent direct longitudinal insertion of the transmission package within housing 11 due to the interference of the boss with a flange portion 27 of end wall 20. Thus, initial insertion of transmission package 10 within housing 11 will permit boss 26 to clear flange 27, when roller 17 is disposed on rail portion 22, and will automatically shift the transmission package rightwardly in FIG. 3 to dispose the boss in its phantom lined position 26', within the housing.

FIG. 1 further illustrates lifting means 28 and 29 for lifting, supporting and moving transmission package 10 longitudinally and vertically during the installation or removal operation. Lifting means 28 may comprise a pair of laterally spaced eye bolts 30, threadably attached to an upper side of transmission package 10 and preferably disposed in at least approximate vertical alignment with the center of gravity (c.g.) thereof. Second lifting means 29 comprises a flat plate 31 releasably attached to the case of transmission package 10 by a plurality of releasable bolts 32. A pair of laterally spaced brackets 33 are welded or otherwise suitably secured on one side of plate 31 and each has a hole 34 formed therethrough.

A standard cable and pulley system 35 may be suitably attached to eye bolt 30 and brackets 33, as shown in FIG. 1, to lift and move transmission package 10 into housing 11. Cable and pully system 35 may comprise a main cable 36 having a hook 37 thereof attached to first ends of secondary cable systems 38 and 39. The opposite ends of secondary cable systems 38 and 39 are releasably attached to eye bolts 30 and brackets 33, as shown, with cable system 39 preferably including a "Come-along" 40 to selectively lengthen or shorten a cable 41 thereof whereby transmission package 10 may be selectively tilted in a vertical plane, should the need arise. Primary cable 36 is, of course, attached to a standard winch or hoist (not shown) to selectively raise or lower transmission package 10. Upon mounting of transmission package 10 within housing 11 to its installed position 10' in FIG. 2, a plurality of fastening means or bolts 42 may be inserted through holes 43, formd through a flange 44 of transmission package 10, and threadably secured within threaded holes 45, formed in outer wall 20 of housing 11 (FIG. 1).

Figure 5:
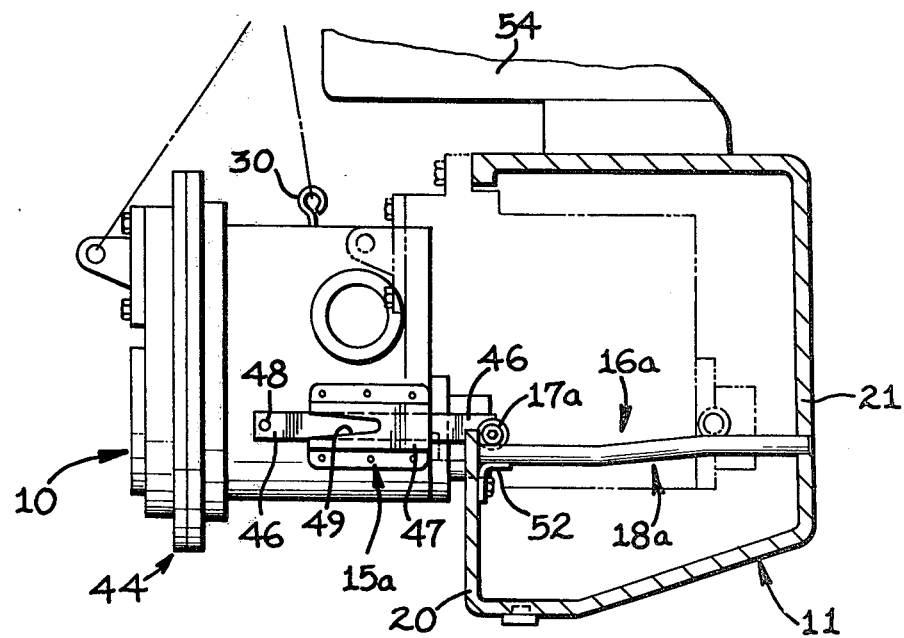
FIGS. 5 and 6 are views similar to FIG. 2, but illustrating a second mounting apparatus embodiment of the present invention for installing the transmission package in the housing.
Figure 6:
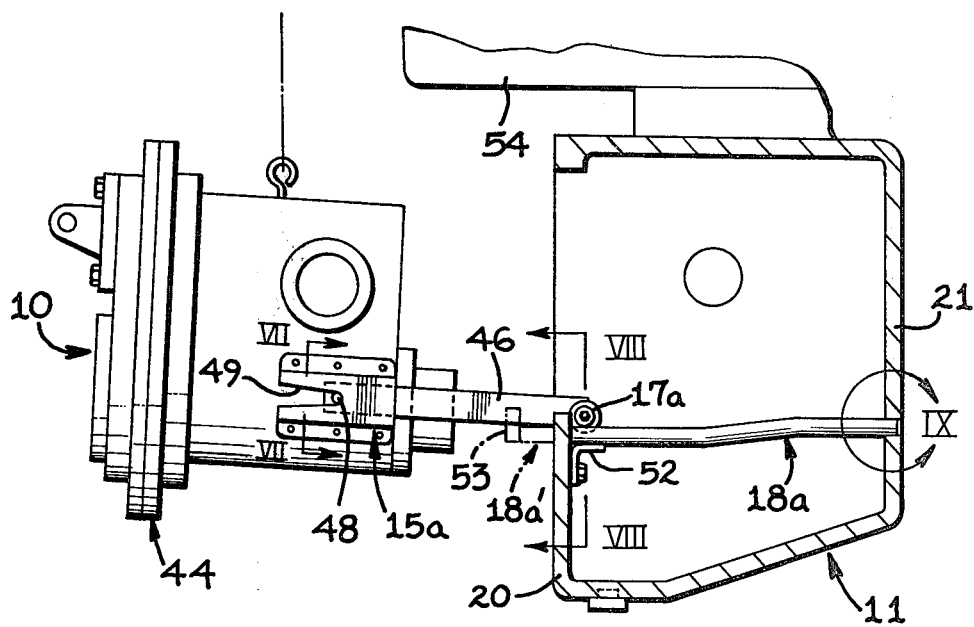

FIGS. 5–9 illustrate modified guide means 15a and 16a wherein identical numerals depict corresponding parts, but with numerals depicting modified constructions appearing in FIGS. 5–9 being accompanied by a subscript "a." First guide means 15a comprises a bar 46 slidably mounted within a bracket 47, secured to each side of transmission package (FIG. 7). A first end of bar 46 has a roller 17a rotatably mounted thereon (FIG. 8) whereas a second end of the bar has a pin 48 secured on the outer side thereof. Pin 48 functions as a stop means for engaging an end of a slot 49, defined in bracket 47, when bar 46 is extendef fully rightwardly, as shown in FIG. 6.

Second guide means 16a comprises a pair of laterally spaced rails 18a( not shown) secured within housing 11. As shown in FIG. 9, a first end of each rail may be secured within a bore 50, formed through wall 21, along with an annular plug 51. The second end of each rail 18a may be suitably secured to wall 20 of housing 11, such as by a bracket 52. In certain transmission package applications, each rail 18a may be extended outwardly past housing 11 to receive a respective roller 17a thereon, as indicated in FIG. 6 by an extension 18a' of the rail. If so desired, a vertically disposed stop 53 may be secured to the end of rail extension 18a', as shown in FIGS. 6 and 8, to engage roller 17a. As shown by the sequence of views in FIGS. 5 and 6, transmission package 10 may be moved leftwardly away from housing 11 while yet maintaining rollers 17a in supporting contact with rails 18a.

Industrial Applicability

Referring to FIGS. 1–4, first and second guide means 15 and 16 are particularly adapted for precisely guiding transmission package 10 within housing 11 upon installation or removal therefrom. Transmission package 10 is preferably of the modular type mounted rearwardly on frame 12 of a construction vehicle, such as a track-type tractor. However, it should be understood that other types of bulky and weighty vehicle components, such as engines, may also avail themselves of first and second guide means 15 and 16 of this invention to facilitate the expeditious and precise installation of the component on a vehicle.

In carrying forth the method steps for installing transmission package 10 within housing 11, cable and pulley system 35 will be connected to eye bolts 30 and brackets 33, as shown in FIG. 1. The forward end of transmission package 10 is then moved into close proximity and into at least approximate alignment with respect to the rearward end of housing 11. As shown in FIG. 2, rollers 17 of first guide means 15, mounted on the forward end of transmission package 10, are engaged in rolling contact with the rearward end of housing 11 at rails 18 of second guide means 16.

Should the need arise, "Come-along" 40 may be actuated to either shorten or lengthen cable 41 thereof to tilt transmission package 10 vertically to permit rollers 17 to engage rails 22 by avoiding any interfering overhangs or the like, such as posed by overhanging portions of a fuel tank. Cable and pulley system 13 and transmission package 10 are then moved rightwardly by simultaneously sliding and guiding movement of rollers 15 on rails 22 to move the forward end of the transmission package towards a forward end of housing 11. Prior to full insertion of transmission package 10 into housing 11, eye bolts 30 would be removed with the forward end of transmission package 10 being fully supported on rails 20 and the rearward end of the transmission package being supported by cable and pulley system 35 and brackets 33.

Upon full insertion of transmission package 10 into housing 11 to its installed position 10' in FIG. 2, drive shaft 13, axles 14, and the attendant drive mechanisms of the power train components may be suitably connected to transmission package 10. Thereafter, bolts 42 may be tightened down to secure flange 44 of transmission package 10 to wall 20 of housing 11. Also, cable and pulley system 35 may be detached from brackets 33 and plate 31 removed from transmission package 10 by releasing bolts 32.

It should be noted that in certain applications of this invention that lifting means 29 can be reversed, as shown by its phantom line position 29' in FIG. 2, and bolts 32 resecured in place. Sufficient space is provided within the interior of transmission package 10 to accomodate the reception of brackets 33 therein, as shown by the stored position 33' of the brackets in FIG. 2.

Should the need arise to remove installed transmission package 10 from housing 11 for servicing or replacement purposes, the above procedure would be reversed. In particular, release of bolts 32 will permit a reversal and securance of lifting means 29 to its full-line position illustrated in FIGS. 1 and 2. Cable and pulley system 35 may then be attached to brackets 33 to support the rearward end of transmission package 10. Upon disconnection of drive shaft 13, drive axles 14 and attendant components of the power train bolts 42 may be released to permit removal of transmission package 10 from housing 11. Upon partial removal of transmission package 10, as shown in FIG. 2, eye bolts 30 may be resecured thereto for attachment to cable system 38 whereby the transmission package can be completely removed from housing 11.

Modified guide means 15a and 16a of FIGS. 5-9 will facilitate the installation and removal of transmission package 10, relative to housing 11, in substantially the same manner as described above. The primary difference between the FIGS. 1-4 guide means 15 and 16 and the FIGS. 5-9 guide means 15a and 16a is that the latter guide means will permit support of the forward end of transmission package 10 on housing 11 while the transmission package is maintained at a substantial distance from the housing to clear interfering structures of the vehicle. In particular, support bars 46 may be extended from transmission package 10 to engage rollers 17a thereof with rails 18a. As shown in FIG. 5, this arrangement facilitates vertical raising of transmission package 10 and clearing of an overhanging portion 54 of the vehicle's fuel tank, for example, upon removal of the transmission package. Rail extensions 18a' may be utilized to further extend the supported distance between the transmission package and the housing.

Other aspects, objects and advantages of this invention can be obtained from a study of the drawings, the disclosure and the appended claims.

We claim:

1. In a vehicle having a stationary support (11), a component (10) removably mounted on said support (11), first guide means (15a) on said component (10) for supporting and guiding said component (10) between removed and installed positions thereof relative to said support (11), second guide means (16a) on said support (11) for engaging said first guide means to support and guide movements of said component (10) between its removed and installed positions, and fastening means (42) for releasably securing said component (10) to said support (11) when said component (10) is in its installed position, the improvement comprising:
said first guide means (15a) including a bar and means (47) for slidably mounting said bar (46) on said component (10) for reciprocal movement thereon between extended and retracted positions.

2. The vehicle of claim 1 wherein said first guide means (15a) further includes at least one roller (17a) rotatably mounted on said bar (46).

3. The vehicle of claim 2 wherein a said roller (17a) is rotatably mounted on a said bar (46) slidably mounted on each lateral side of said component (10).

4. The vehicle of claim 1 wherein said mounting means includes a bracket (47) secured on a side of said component (10), said bar (46) slidably mounted in said bracket (47).

5. The vehicle of claim 1 further including stop means (48) for limiting said extended position of said bar (46) relative to said component (10).

6. The vehicle of claim 1 wherein said second guide means (16a) includes a rail (18a) secured on said support (11) and at least approximately disposed in parallel relationship relative to a longitudinal axis (X) of said component (10).

7. The vehicle of claim 6 wherein said rail (18a) includes an extension (18a') extending exteriorly of said support (11).

8. The vehicle of claim 6 wherein said rail (18a) includes a first rail portion (22) which is at least approximately parallel relative to the longitudinal axis (X) of said component (10), and a second rail portion (23) which is displaced vertically relative to said first rail portion (22).

9. The vehicle of claim 6 wherein said rail (18a) includes a first rail portion (22) and a second rail portion (23) displaced laterally relative to said first rail portion (22).

10. The vehicle of claim 1 further including a vehicle frame (12) and wherein said support (11) includes a housing secured on said frame (12) and said component (10) includes a transmission package.

* * * * *